United States Patent
Huang et al.

(10) Patent No.: US 9,812,968 B2
(45) Date of Patent: Nov. 7, 2017

(54) ZERO VOLTAGE SWITCHING DETECTION APPARATUS AND METHOD

(71) Applicant: Futurewei Technologies, Inc., Plano, TX (US)

(72) Inventors: Jinbo Huang, Shenzhen (CN); Xujun Liu, Shenzhen (CN); Dianbo Fu, Plano, TX (US); Liming Ye, Frisco, TX (US); Heping Dai, Plano, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 72 days.

(21) Appl. No.: 14/548,106

(22) Filed: Nov. 19, 2014

(65) Prior Publication Data

US 2016/0141960 A1 May 19, 2016

(51) Int. Cl.
*H02M 3/158* (2006.01)
*H02M 3/335* (2006.01)
*H02M 1/00* (2006.01)

(52) U.S. Cl.
CPC ....... *H02M 3/33507* (2013.01); *H02M 3/158* (2013.01); *H02M 3/1582* (2013.01); *H02M 2001/0009* (2013.01); *H02M 2001/0058* (2013.01); *Y02B 70/1433* (2013.01)

(58) Field of Classification Search
CPC . H02M 2001/0009; H02M 2001/0058; H02M 3/1582; H02M 3/156; H02M 3/158; H02M 3/1588
See application file for complete search history.

(56) References Cited

U.S. PATENT DOCUMENTS

| | | | |
|---|---|---|---|
| 5,475,296 A | 12/1995 | Vinsant et al. | |
| 5,610,508 A | * 3/1997 | Kammiller | H02M 3/337 323/358 |
| 5,793,191 A | * 8/1998 | Elmore | H02J 1/102 323/272 |
| 5,977,754 A | * 11/1999 | Cross | H02M 1/34 323/222 |
| 6,069,458 A | 5/2000 | Takehara et al. | |
| 2002/0030493 A1 | 3/2002 | Hui et al. | |
| 2005/0226012 A1 | 10/2005 | Jovanovic et al. | |
| 2005/0265058 A1 | 12/2005 | Stevanovic et al. | |
| 2007/0290656 A1 | 12/2007 | Lee Tai Keung | |
| 2008/0100273 A1 | 5/2008 | Uruno et al. | |
| 2009/0100273 A1 | 4/2009 | Miller | |
| 2012/0300503 A1 | 11/2012 | Yang et al. | |

(Continued)

FOREIGN PATENT DOCUMENTS

| CN | 101170277 A | 4/2008 |
|---|---|---|
| CN | 201054853 Y | 4/2008 |

(Continued)

*Primary Examiner* — Harry Behm
(74) *Attorney, Agent, or Firm* — Slater Matsil, LLP

(57) ABSTRACT

A converter comprises a switch network coupled to a power source, wherein the switch network comprises a plurality of power switches, a magnetic device coupled to the switch network, a detector coupled to the magnetic device through a magnetic coupling and a control circuit configured to receive a zero voltage switching signal from the detector and adjust gate drive signals of the power switches based upon the zero voltage switching signal.

20 Claims, 8 Drawing Sheets

(56) References Cited

U.S. PATENT DOCUMENTS

| | | | |
|---|---|---|---|
| 2014/0055168 A1* | 2/2014 | Deng | H02M 1/00 327/108 |
| 2014/0177286 A1 | 6/2014 | Sonobe | |
| 2014/0334202 A1* | 11/2014 | Cameron | H02J 5/00 363/56.01 |
| 2015/0280592 A1* | 10/2015 | Hu | H02M 3/156 363/21.04 |

FOREIGN PATENT DOCUMENTS

| | | |
|---|---|---|
| CN | 101309542 A | 11/2008 |
| CN | 103825475 A | 5/2014 |

\* cited by examiner

ZERO VOLTAGE SWITCHING DETECTION APPARATUS AND METHOD

TECHNICAL FIELD

The present invention relates to a dc/dc converter, and, in particular embodiments, to a zero voltage switching detection apparatus for dc/dc converters.

BACKGROUND

A telecommunication network power system usually includes an AC-DC stage converting the power from the AC utility line to a 48 V DC distribution bus and a DC-DC stage converting the 48 V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, LLC resonant converters and the like.

As technologies further advance, bus converters have been widely employed in the telecommunication industry. The bus voltages may be divided into three categories, a 12 V bus voltage converted from a 48 V input dc power supply, a 48 V bus voltage converted from a 380 V input dc power supply and a 12 V bus voltage converted from a 380 V input dc power supply. A bus converter not only converts the input voltage from a higher level to a lower level, but also provides isolation through a magnetic device such as transformers and/or the like.

The intermediate bus voltage such as 12 V may function as an input power bus for a plurality of downstream non-isolated power converters. The downstream non-isolated power converters may be implemented as step-down dc/dc converter converters such as buck converters, step-up dc/dc converter converters such as boost converters, linear regulators, any combinations thereof. The downstream non-isolated power converters operate under a tight control loop so that fully regulated output voltages are fed into their respective loads.

SUMMARY OF THE INVENTION

These and other problems are generally solved or circumvented, and technical advantages are generally achieved, by preferred embodiments of the present invention which provide a system, apparatus and method for achieving a high efficiency non-isolated power converter.

In accordance with an embodiment, a converter comprises a switch network coupled to a power source, wherein the switch network comprises a plurality of power switches, a magnetic device coupled to the switch network, a detector coupled to the magnetic device through a magnetic coupling and a control circuit configured to receive a zero voltage switching signal from the detector and adjust gate drive signals of the power switches based upon the zero voltage switching signal.

In accordance with another embodiment, a method comprises providing a power converter, wherein the power converter comprises an inductor coupled to a switch network, a detector coupled to the inductor through a magnetic coupling and a control circuit coupled between the detector and the switch network.

The method further comprises detecting a signal indicating a soft switching process of a power switch of the switch network and turning on the power switch after a magnitude of the signal is less than a predetermined threshold.

In accordance with yet another embodiment, a method comprises providing a dc/dc converter, wherein the dc/dc converter comprises a switch network coupled to a power source, wherein the switch network comprises a plurality of power switches, a magnetic device coupled to the switch network, a detector coupled to the magnetic device and a control circuit coupled between the detector and the switch network.

The method further comprises detecting a signal indicating a zero voltage switching process of a power switch of the dc/dc converter and turning on the power switch by the control circuit after the signal indicating the zero voltage switching process drops below a predetermined threshold.

An advantage of a preferred embodiment of the present invention is the efficiency of a dc/dc converter can be improved by turning on a power switch through a zero voltage transition. The zero voltage transition is achieved by detecting the voltage across the power switch through a magnetic coupling between a zero voltage switching detector and an inductor of the dc/dc converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a zero voltage switching detector for a high efficiency non-isolated dc/dc converter. The invention may also be applied, however, to a variety of dc/dc converters including buck dc/dc converters, boost dc/dc converters, buck-boost dc/dc converters, flyback converters, forward converters, half bridge, full bridge converters, any combinations thereof and the like. Hereinafter, various embodiments will be explained in detail with reference to the accompanying drawings.

Figure 1:
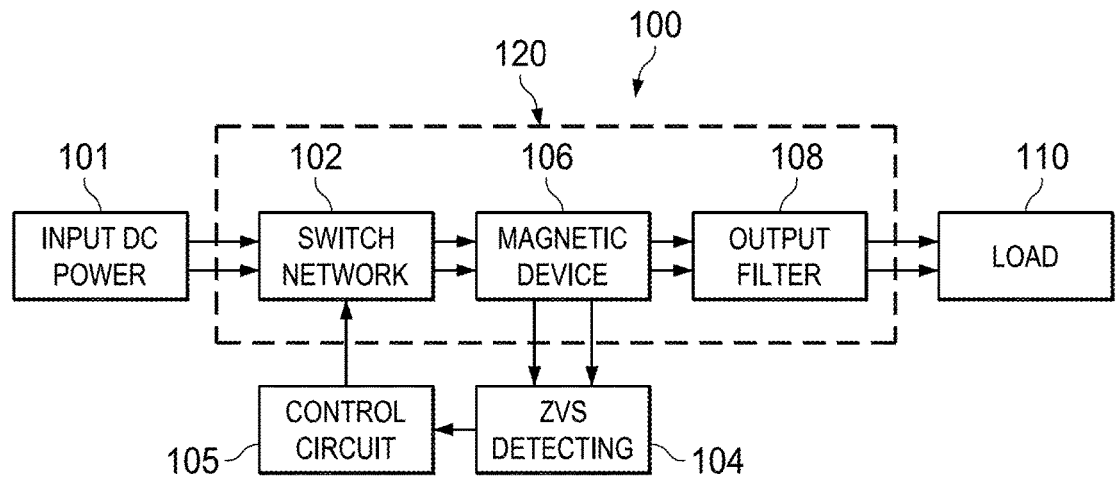
FIG. 1 illustrates a block diagram of a power converter having a zero voltage switching (ZVS) detection apparatus in accordance with various embodiments of the present disclosure.

FIG. 1 illustrates a block diagram of a power converter having a zero voltage switching (ZVS) detection apparatus in accordance with various embodiments of the present disclosure. The power converter 100 may include an input dc power source 101, a switch network 102, a magnetic device 106, an output filter 108, a load 110, a detector 104 and a control circuit 105. As shown in FIG. 1, the switch network 102, the magnetic device 106 and the output filter 108 are connected in cascade between the input dc power source 101 and the load 110.

In some embodiments, the switch network 102, the magnetic device 106 and the output filter 108 may form a power stage 120 of the power converter 100. According to some embodiments, the power stage 120 may be a buck dc/dc converter. The block diagram in FIG. 1 is merely an example, which should not unduly limit the scope of the claims. One of ordinary skill in the art would recognize many variations, alternatives, and modifications. For example, the switching network 102 may be placed on the right side of the magnetic device 106 when the power converter 100 is a boost dc/dc converter. Furthermore, there may be two switch networks (not shown) on opposite sides of the magnetic device 106 when the power converter 100 is a buck-boost dc/dc converter. The detailed system configurations of the boost dc/dc converter and the buck-boost dc/dc converter will be described below with respect to FIG. 5 and FIG. 7 respectively.

The detector 104 is coupled to the magnetic device 106 through a magnetic coupling. In some embodiments, the magnetic coupling is implemented as a signal transformer (not shown). The primary side of the signal transformer is an inductor of the power converter 100. The detailed implementation of the magnetic coupling will be described below with respect to FIGS. 3, 5 and 7.

FIG. 1 further illustrates a control circuit 105 coupled between the detector 104 and the switch network 102. In some embodiments, the control circuit 105 may comprise a digital controller capable of processing the detected signal from the detector 104. Furthermore, control circuit 105 may comprise a pulse width modulation (PWM) generator and at least one gate driver. The operation principles and structures of the PWM generator and the gate driver are well known, and hence are not discussed herein to avoid repetition.

The detector 104, as shown in FIG. 1, detects a signal from the power stage 120. The detected signal may include a signal indicating whether a voltage across a power switch of the power converter 100 is approximately equal to zero. In some embodiments, prior to the turn-on of a power switch, the voltage across the power switch may drop to about zero. In other words, the power switch is ready for a zero voltage transition from a turn-off state to a turn-on state. The detector 104 may detect the voltage change across the power switch through the magnetic coupling. In some embodiments, the detector 104 sends the detected signal to the control circuit 105. The control circuit 105 compares the detected signal with a predetermined threshold. If the magnitude of the detected signal drops below the threshold, the control circuit 105 may turn on the power switch accordingly. As a result, the power converter 100 may achieve higher efficiency through zero voltage switching.

It should be noted that the control circuit 105 may determine the turn-on time of the power switch based upon the detected signal as well as various delays. For examples, there may be detecting circuit delay from the detector 104 and driver delay from the control circuit 105. In order to achieve a better ZVS process, the control circuit 105 may consider both delays and determine an appropriate turn-on time accordingly.

One advantageous feature of having the detector 104 shown in FIG. 1 is that the detector 104 and the control circuit 105 may turn on a power switch of the power converter 100 based upon a real-time detected signal from the detector 104. As such, the power converter 100 is capable of dynamically adjust the turn-on time of the power switch so that the power converter 100 can achieve higher efficiency through zero voltage switching.

Figure 2:
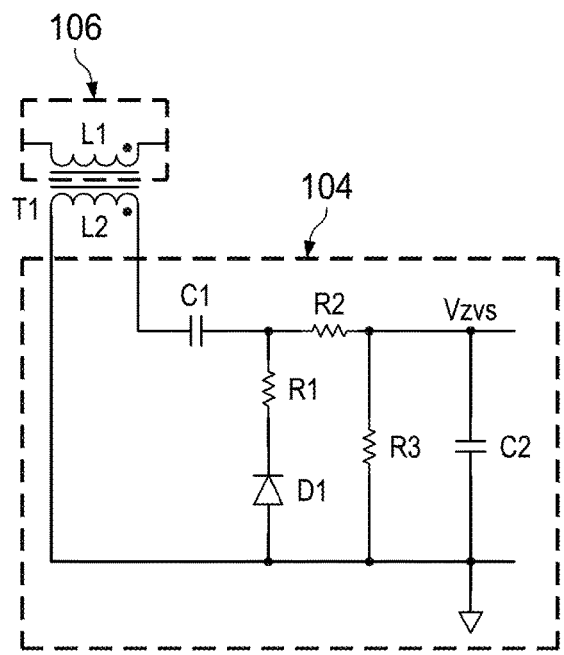
FIG. 2 illustrates a schematic diagram of the detector shown in FIG. 1 in accordance with various embodiments of the present disclosure.

FIG. 2 illustrates a schematic diagram of the detector shown in FIG. 1 in accordance with various embodiments of the present disclosure. The detector 104 is coupled to the magnetic device 106 through a signal transformer T1. In some embodiments, a primary side of the signal transformer T1 is an inductor L1 of the power converter 100. A secondary side L2 of the signal transformer T1 is coupled to the detector 104.

The detector 104 comprises a first capacitor C1, a second capacitor C2, a diode D1, a resistor R1 and a voltage divider. As shown in FIG. 2, the first capacitor C1 has a first terminal connected to the secondary side of the signal transformer T1. The diode D1 and the resistor R1 are connected in series and further coupled to a second terminal of the first capacitor C1. The voltage divider is formed by resistors R2 and R3. The voltage divider is coupled to the second terminal of the first capacitor C1. The second capacitor C2 and the resistor R3 are connected in parallel as shown in FIG. 2.

The first capacitor C1 may function as a dc blocking capacitor. The diode D1 may function as a rectifier. The resistor R1 is used to limit the current flowing through the diode D1. The second capacitor C2 may function as a filter to attenuate undesired noise. The voltage divider is employed to scale the detected signal down to a level suitable for the control circuit 105.

In some embodiments, the capacitance of C1 is equal to 100 pF. The resistance of R1 is equal to 1 Kohm. The capacitance of C2 is equal to 1 nF. The resistance of R2 is equal to 10 Kohm. The resistance of R3 is equal to 2 Kohm. It should be noted that the values given above are selected purely for demonstration purposes and are not intended to limit the various embodiments of the present invention to any particular values. A person skilled in the art will recognize that, depending on different application and design needs, the resistance and capacitance recited above may be changed to different values.

One advantageous feature of the detector 104 shown in FIG. 2 is that the detector 104 is capable of detecting a signal indicating a zero voltage transition of a power switch through a magnetic coupling formed by the signal transformer T1. Such a signal helps the power converter 100 achieve zero voltage switching. The soft switching operation of the power switch helps the power converter 100 achieve high efficiency.

It should be noted that the schematic diagram shown in FIG. 2 is merely an example, which should not unduly limit the scope of the claims. One of ordinary skill in the art would recognize many variations, alternatives, and modifications.

Figure 3:
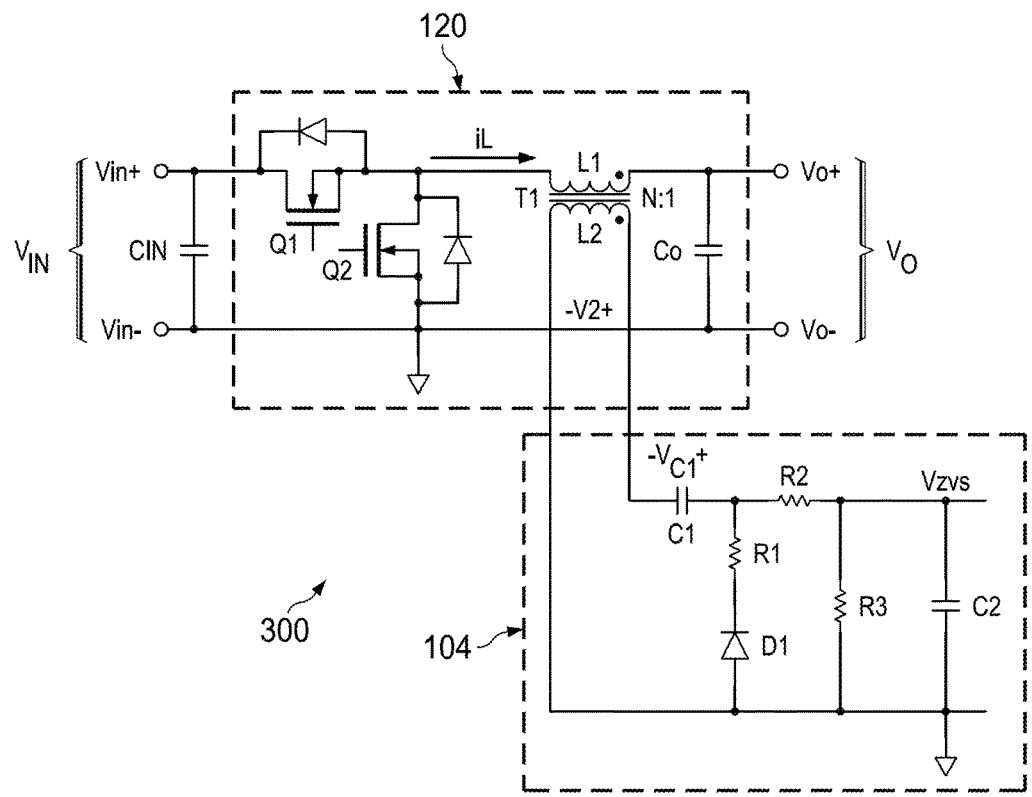
FIG. 3 illustrates a first implementation of the power converter shown in FIG. 1 in accordance with various embodiments of the present disclosure.

FIG. 3 illustrates a first implementation of the power converter shown in FIG. 1 in accordance with various embodiments of the present disclosure. As shown in FIG. 3, the power converter 300 is a buck dc/dc converter. The buck dc/dc converter comprises a high-side switch Q1, a low-side switch Q2 and an inductor L1. The inductor L1 is a primary side of a signal transformer T1. As shown in FIG. 3, the transformer ratio of T1 is N:1. The secondary L2 is coupled to the detector 104.

In accordance with the operation principles of buck dc/dc converters, the high-side switch Q1 and the low-side switch Q2 operate in a complementary mode. The ratio of the conduction time of the high-side switch Q1 over the switching period of the buck dc/dc converter is referred to as the duty cycle of the buck dc/dc converter. The duty cycle is set by a PWM controller (e.g., control circuit 105) and/or the like. To maintain the output voltage at a predetermined voltage, when the output voltage drops below the predetermined voltage, the high-side switch Q1 is turned on and the low-side switch Q2 is turned off so that the output capacitor Co is charged from the input through the turned on high-side switch Q1 and the output inductor L1. On the other hand, when the output voltage exceeds the predetermined voltage, the PWM controller turns off the high switch Q1 and turns on the low-side switch Q2 so that the output voltage is discharged to ground through the turned on low-side switch Q2 and the output inductor L1. As a result, the electronic circuits (e.g., load 110 shown in FIG. 1) coupled to the buck dc-dc converter can receive a constant output voltage under load and temperature fluctuations.

In steady state operation of the buck dc/dc converter, the detector 104 helps the high-side switch Q1 achieve zero voltage switching. The first capacitor C1 functions as a dc blocking capacitor. The voltage across the first capacitor C1 may be given by the following equation:

$$V_{C1} = \frac{Vin - Vo}{N} \quad (1)$$

Prior to the turn-off of the low-side switch Q2, the voltage across the secondary side of the signal transformer T1 is given by the following equation:

$$V2 = \frac{Vo}{N} \quad (2)$$

The voltage at the input of the voltage divider is equal to the sum of Vc1 and V2. As such, the output of the detector 104 may be expressed as:

$$V_{ZVS} = \frac{Vin}{N} \cdot \frac{R3}{R2 + R3} = \frac{Vin}{K} \quad (3)$$

After the turn-off of the low-side switch Q2 and prior to the turn-on of the high-side switch Q1, the voltage across the high-side switch Q1 may drop to a level approximately equal to zero. As a result, the voltage across the secondary side of the signal transformer T1 is given by the following equation:

$$V2 = \frac{-(Vin - Vo)}{N} \quad (4)$$

The voltage across the capacitor C1 may stay at the level shown in Equation (1). As a result, the voltage at the output of the detector may drop to a level approximately equal to zero. As such, the zero voltage switching of the high-side switch Q1 may be detected through a voltage drop at the output of the detector 104. The detailed waveforms the buck dc/dc converter and the operating principle of the detector 104 will be described in detail below with respect to FIG. 4.

Figure 4:
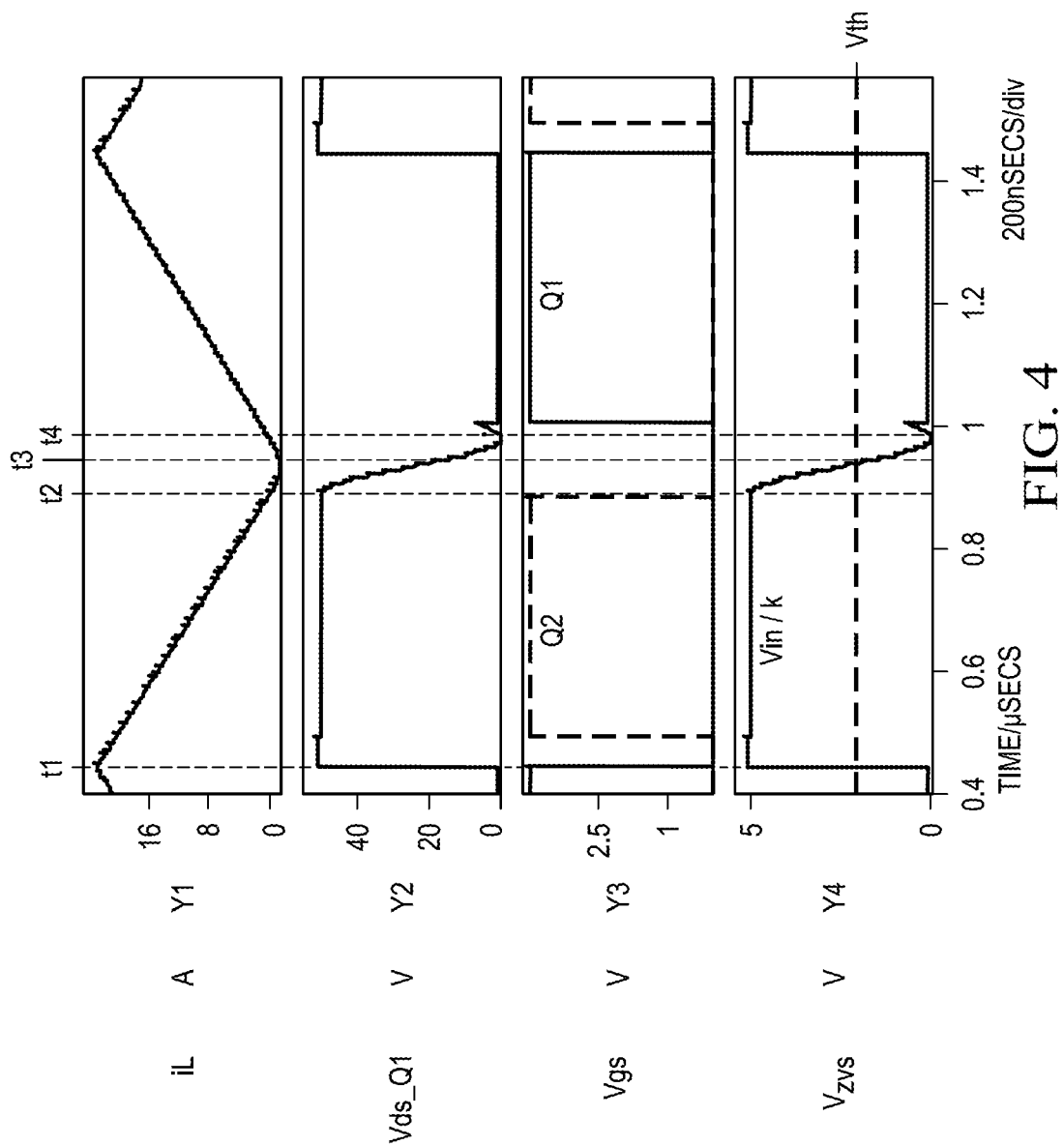
FIG. 4 illustrates various waveforms of the power converter shown in FIG. 3 in accordance with various embodiments of the present disclosure.

FIG. 4 illustrates various waveforms of the power converter shown in FIG. 3 in accordance with various embodiments of the present disclosure. The horizontal axis of FIG. 4 represents intervals of time. The unit of the horizontal axis is micro second. There may be four vertical axes. The first vertical axis Y1 represents the current flowing through the inductor L1 of the power converter 300 shown in FIG. 3. The second vertical axis Y2 represents the voltage across the high-side switch Q1. The third vertical axis Y3 represents the gate drive signals of the high-side switch Q1 and the low-side switch Q2. The fourth vertical axis Y4 represents the voltage at the output of the detector 104.

At time t1, the low-side switch Q2 is turned on and the high-side switch Q1 is turned off. The current flowing into the inductor L1 reaches its peak value. Since the high-side switch Q1 is turned off, the voltage across the high-side switch Q1 is approximately equal to the input voltage of the power converter 100. According to Equation (3) above, the voltage at the output of the detector 104 may be equal to Vin/K.

At time t2, the low-side switch Q2 is turned off. The current of the power converter 100 may flow through the body diode of the low-side switch Q2 before the high-side switch Q1 is turned on. As shown in FIG. 4, the voltage across the high-side switch Q1 starts to drop at time t2 and reaches a level approximately equal to zero at time t4. As a result of the drop of the voltage across the high-side switch Q1, the output of the detector 104 drops from Vin/K to about zero at time t4. At time t4, the voltage across the high-side switch Q1 is approximately equal to zero. In other words, at time t4, the high-side switch Q1 is ready for a zero voltage transition.

In order to turn on the high-side switch Q1 under a zero voltage stress or a voltage stress close to zero, a predetermined threshold Vth is selected based upon design needs. In some embodiments, the threshold Vth is in a range from about 0.5 V to about 1 V. As shown in FIG. 4, at time t3, the output voltage of the detector 104 reaches the threshold Vth. The control circuit 105 receives the detected signal from the detector 104 and compares the detected signal with the predetermined threshold Vth. At time t3, the magnitude of the detected signal is equal to the threshold. The control circuit 105 may turn on the high-side switch Q1 accordingly. As a result, the power converter 100 may achieve higher efficiency through the zero voltage switching of the high-side switch Q1.

Figure 5:
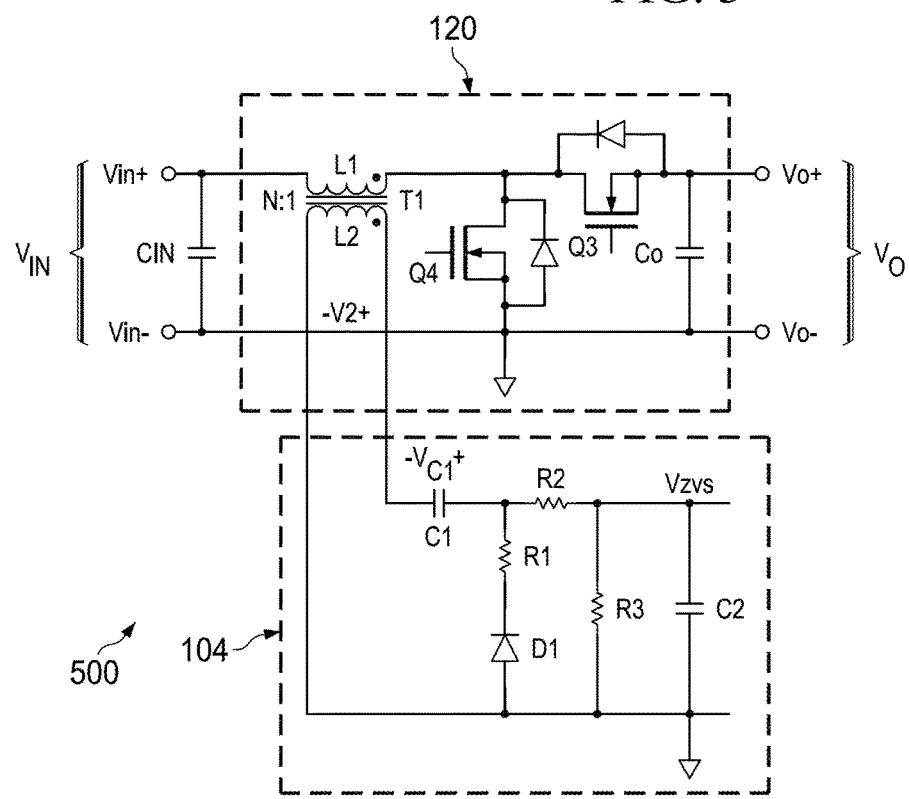
FIG. 5 illustrates a second implementation of the power converter shown in FIG. 1 in accordance with various embodiments of the present disclosure.

FIG. 5 illustrates a second implementation of the power converter shown in FIG. 1 in accordance with various embodiments of the present disclosure. The power converter 500 shown in FIG. 5 is similar to the power converter 300 shown in FIG. 3 except that the power stage 120 is a boost dc/dc converter. The boost dc/dc converter comprises a high-side switch Q3, a low-side switch Q4 and an inductor L1. In some embodiments, the high-side switch Q3 and the low-side switch Q4 operate in a complementary mode. The operation principles of boost converters are well known, and hence are not discussed in detail herein.

By using the same circuit analysis method described above with respect to FIG. 3, prior to the turn-off of the high-side switch Q3, the output of the detector 104 may be expressed as:

$$V_{ZVS} = \frac{Vo}{N} \cdot \frac{R3}{R2 + R3} = \frac{Vo}{K} \quad (5)$$

After the turn-off of the high-side switch Q3 and prior to the turn-on o the low-side switch Q4, the zero voltage switching of the low-side switch Q4 may be detected through a voltage drop at the output of the detector 104. The detailed waveforms of the boost dc/dc converter and the operating principle of the detector 104 will be described below with respect to FIG. 6.

Figure 6:
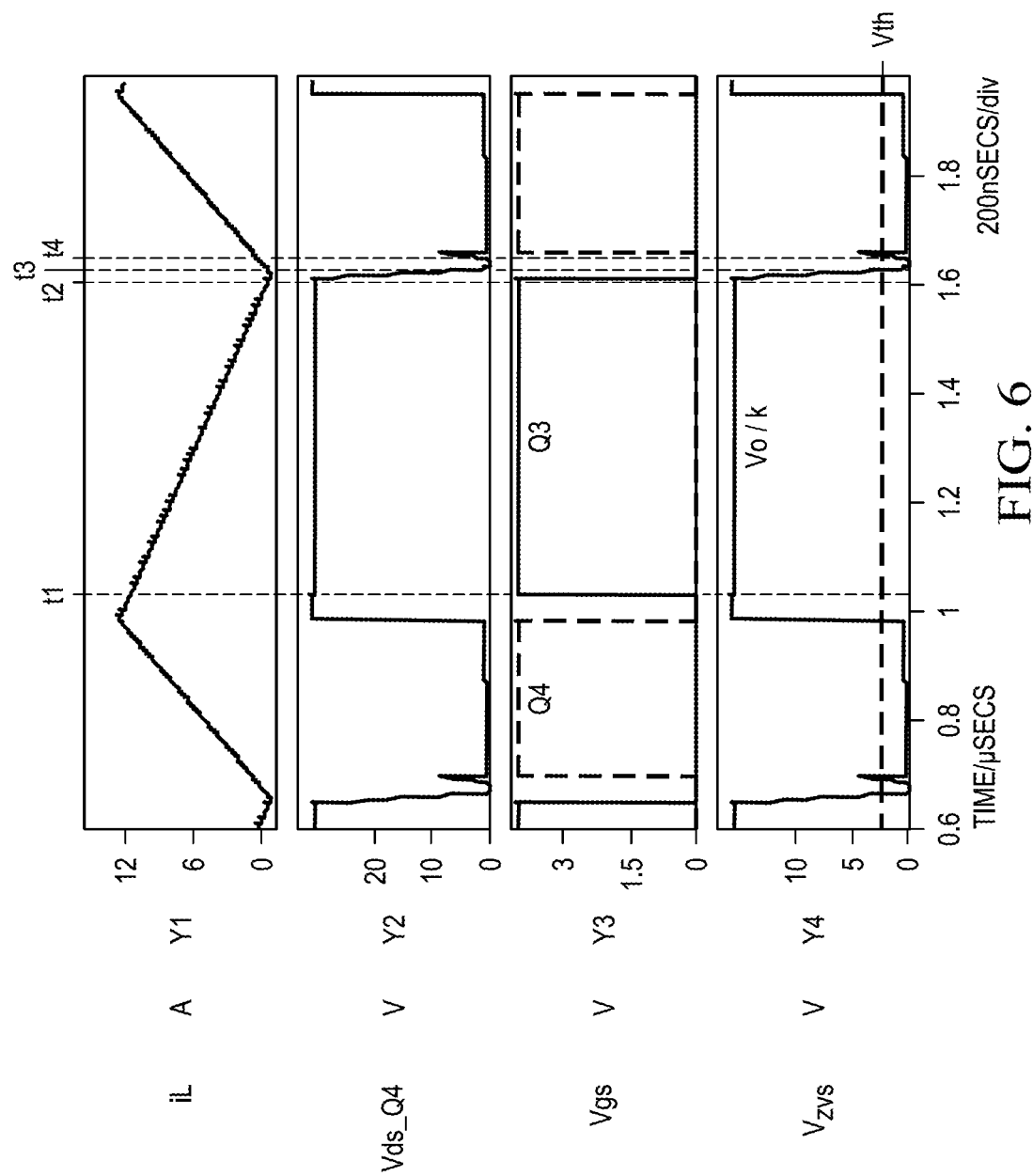
FIG. 6 illustrates various waveforms of the power converter shown in FIG. 5 in accordance with various embodiments of the present disclosure.

FIG. 6 illustrates various waveforms of the power converter shown in FIG. 5 in accordance with various embodiments of the present disclosure. The horizontal axis of FIG. 6 represents intervals of time. The unit of the horizontal axis is micro second. There may be four vertical axes. The first vertical axis Y1 represents the current flowing through the inductor L1 of the power converter 500 shown in FIG. 5. The second vertical axis Y2 represents the voltage across the low-side switch Q4. The third vertical axis Y3 represents the gate drive signals of the high-side switch Q3 and the low-side switch Q4. The fourth vertical axis Y4 represents the voltage at the output of the detector 104.

At time t1, the high-side switch Q3 is turned on and the low-side switch Q4 is turned off. Since the high-side switch Q3 is turned on, the voltage across the low-side switch Q4 is approximately equal to the output voltage of the power converter 100. According to Equation (5) above, the voltage at the output of the detector 104 may be equal to Vo/K.

At time t2, the high-side switch Q3 is turned off. The current of the power converter 100 may flow through the body diode of the high-side switch Q3 before the low-side switch Q4 is turned on. As shown in FIG. 6, the voltage across the low-side switch Q4 starts to drop at time t2 and reaches a level approximately equal to zero at time t4. As a result of the drop of the voltage across the low-side switch Q4, the output of the detector 104 drops from Vo/K to about zero at time t4. At time t4, the voltage across the low-side switch Q4 is approximately equal to zero. In other words, the low-side switch Q4 is ready for a zero voltage transition.

In order to turn on the low-side switch Q4 under a zero voltage stress or a voltage stress close to zero, a predetermined threshold Vth is selected based upon design needs. In some embodiments, the threshold Vth is in a range from about 0.5 V to about 1 V. As shown in FIG. 6, at time t3, the output voltage of the detector 104 reaches the threshold. The control circuit 105 receives the detected signal from the detector 104 and compares the detected signal with the predetermined threshold Vth. At time t3, the magnitude of the detected signal is equal to the threshold Vth. The control circuit 105 may turn on the low-side switch Q4 accordingly. As a result, the power converter 500 may achieve higher efficiency through the zero voltage switching of the low-side switch Q4.

Figure 7:
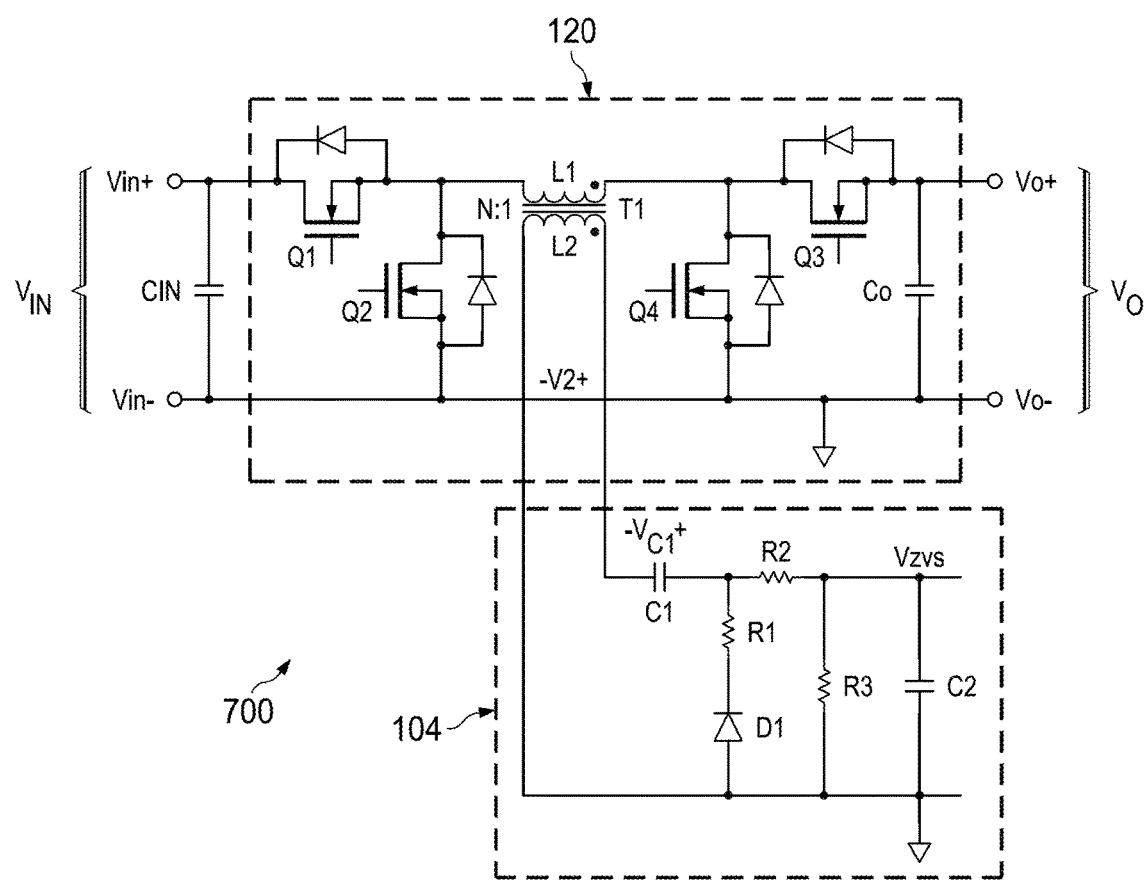
FIG. 7 illustrates a third implementation of the power converter shown in FIG. 1 in accordance with various embodiments of the present disclosure.

FIG. 7 illustrates a third implementation of the power converter shown in FIG. 1 in accordance with various embodiments of the present disclosure. The power converter 700 shown in FIG. 7 is similar to the power converter 300 shown in FIG. 3 except that the power stage 120 is a buck-boost dc/dc converter.

The buck-boost dc/dc converter comprises a first high-side switch Q1, a first low-side switch Q2, a second high-side switch Q3, a second low-side switch Q4 and an inductor L1. In some embodiments, the buck-boost dc/dc converter may comprise two operation modes, namely a buck operation mode and a boost operation mode. In the buck operation mode, the switches Q1 and Q2 are active switches. On the other hand, in the boost operation mode, the switches Q3 and Q4 are active switches. In alternative embodiments, the buck-boost dc/dc converter may comprise one operation mode. All switches Q1, Q2, Q3 and Q4 are active switches. These two types of buck-boost dc/dc converters are well known, and hence their operation principles of boost converters are not discussed in detail herein.

By using the same method described above with respect to FIG. 3, after the turn-off of the second low-side switch Q4 and prior to the turn-off of the first high-side switch Q1, the output of the detector 104 may be expressed as:

$$V_{ZVS} = \frac{Vo}{N} \cdot \frac{R3}{R2 + R3} = \frac{Vo}{K} \quad (6)$$

Furthermore, after the turn-off of the first high-side switch Q1, the output of the detector 104 may be expressed as:

$$V_{ZVS} = \frac{Vin + Vo}{N} \cdot \frac{R3}{R2 + R3} = \frac{Vin + Vo}{K} \quad (7)$$

As shown in Equations (6) and (7), the output of the detector 104 may have two voltage levels. The zero voltage switching of the second low-side switch Q4 may be detected through a voltage drop at the output of the detector 104. The detailed waveforms of the buck-boost dc/dc converter and the operating principle of the detector 104 will be described below with respect to FIGS. 8-10.

Figure 8:
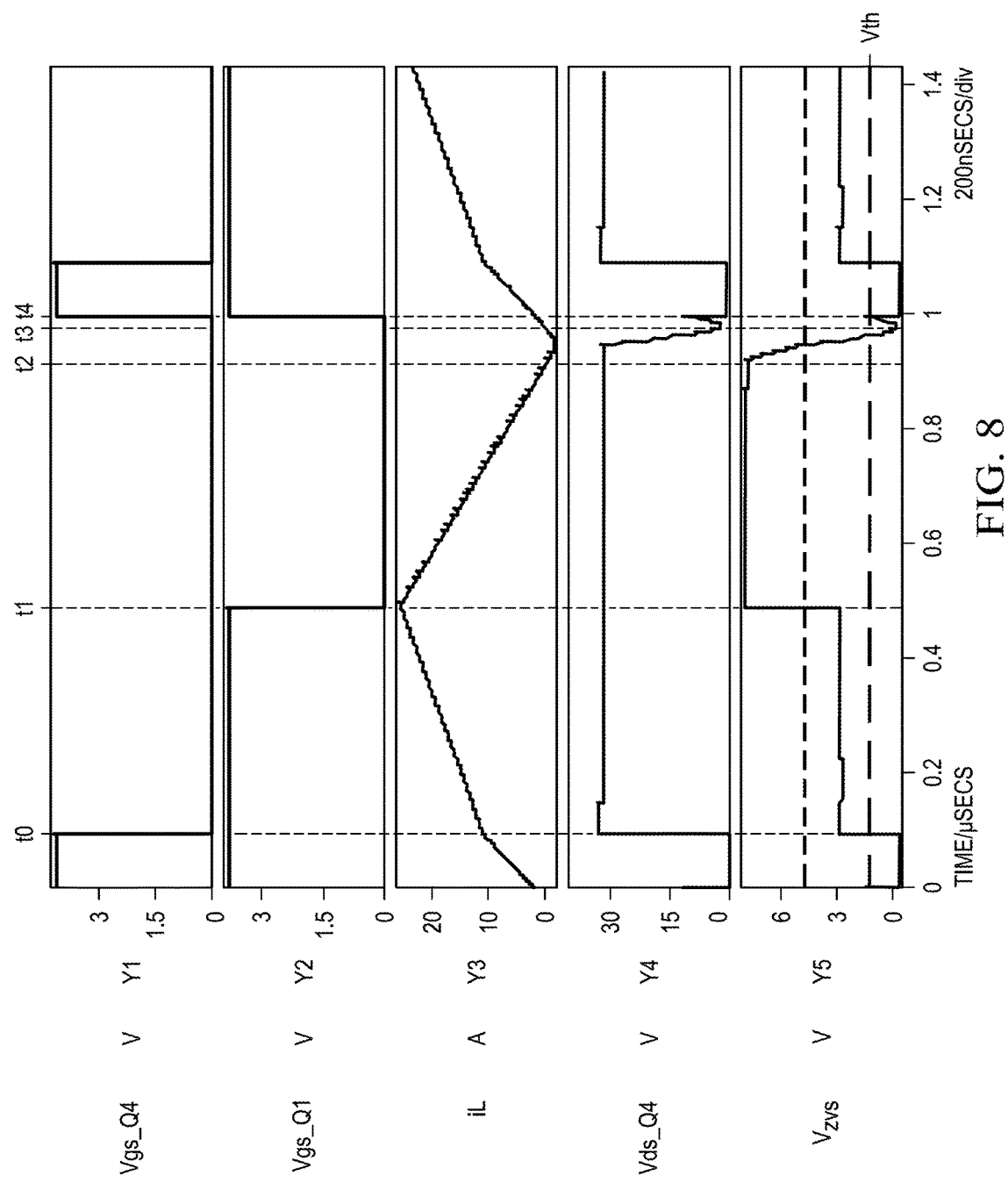
FIG. 8 illustrates a first group of waveforms of the power converter shown in FIG. 7 in accordance with various embodiments of the present disclosure.

FIG. 8 illustrates a first group of waveforms of the power converter shown in FIG. 7 in accordance with various embodiments of the present disclosure. The waveforms in FIG. 7 are obtained when the input voltage of the power converter 700 is greater than the output voltage of the power converter 700.

The horizontal axis of FIG. 8 represents intervals of time. The unit of the horizontal axis is micro second. There may be five vertical axes. The first vertical axis Y1 represents the gate drive signal of the second low-side switch Q4. The second vertical axis Y2 represents the gate drive signal of the first high-side switch Q1. The third vertical axis Y3 represents the current flowing through the inductor L1 of the power converter 700 shown in FIG. 7. The fourth vertical axis Y4 represents the voltage across the second low-side switch Q4. The fifth vertical axis Y5 represents the voltage at the output of the detector 104.

At time t0, the second low-side switch Q4 is turned off. Since the second high-side switch Q3 is turned on, the voltage across the second low-side switch Q4 is approximately equal to the output voltage of the power converter 700. According to Equation (6) above, the voltage at the output of the detector 104 may be equal to Vo/K.

At time t1, the first high-side switch Q1 is turned off. Since the second high-side switch Q3 is still on, the voltage across the second low-side switch Q4 is approximately equal to the output voltage of the power converter 700. According to Equation (7) above, the voltage at the output of the detector 104 may be equal to (Vin+Vo)/K.

At time t2, the voltage across the second low-side switch Q4 starts to drop and reaches a level approximately equal to zero at time t4. As a result of the drop of the voltage across the second low-side switch Q4, the output of the detector 104 drops from (Vin+Vo)/K to about zero at time t4. At time t4, the voltage across the second low-side switch Q4 is approximately equal to zero. In other words, the second low-side switch Q4 is ready for a zero voltage transition.

In order to turn on the second low-side switch Q4 under a zero voltage stress or a voltage stress close to zero, a predetermined threshold Vth is selected based upon design needs. In some embodiments, the threshold Vth is in a range from about 0.5 V to about 1 V. As shown in FIG. 8, at time t3, the output voltage of the detector 104 reaches the threshold. The control circuit 105 receives the detected signal from the detector 104 and compares the detected signal with the predetermined threshold. At time t3, the magnitude of the detected signal is equal to the threshold. The control circuit 105 may turn on the second low-side switch Q4 and the first high-side switch Q1 accordingly. As a result, the power converter 700 may achieve higher efficiency through zero voltage switching.

Figure 9:
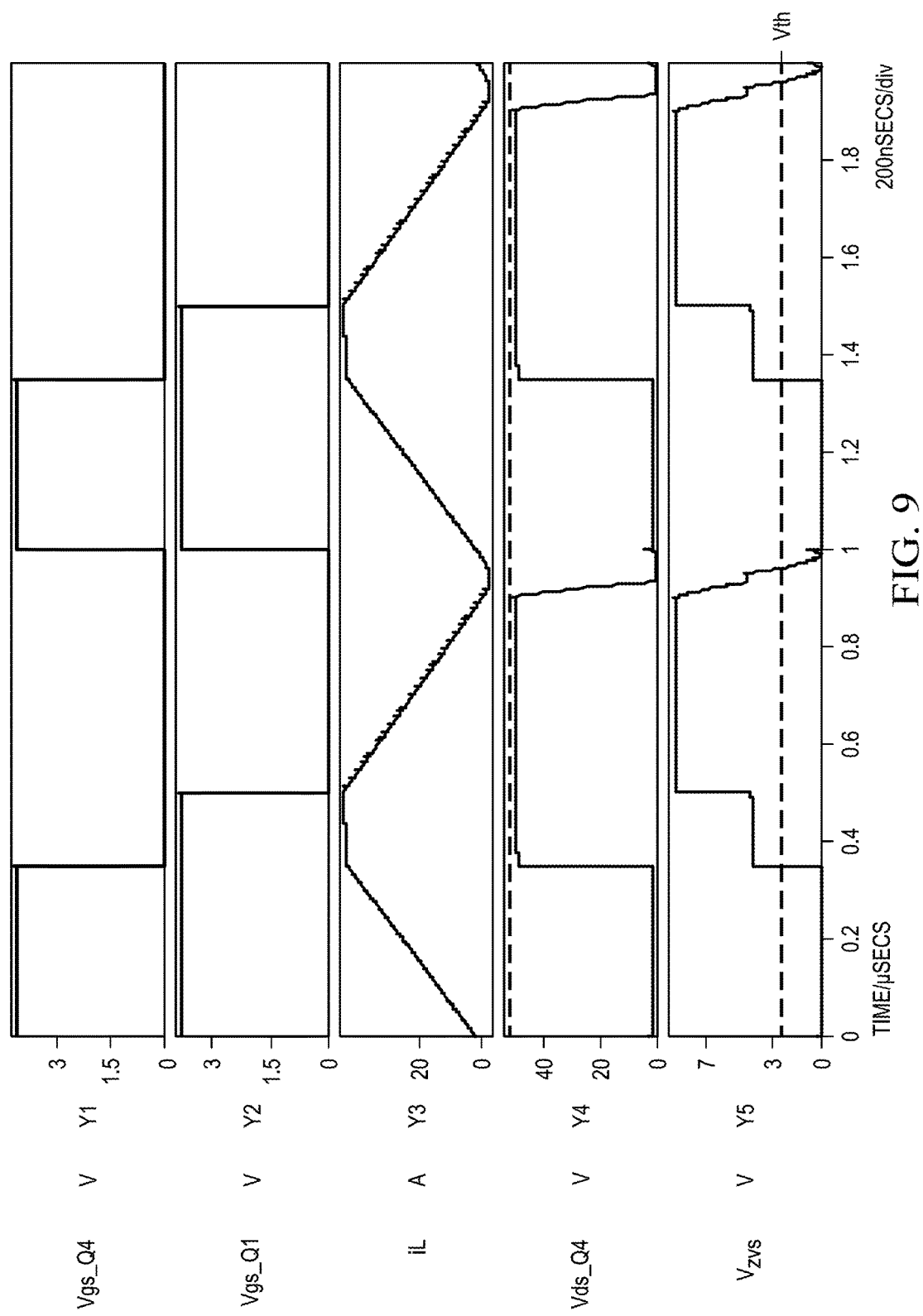
FIG. 9 illustrates a second group of waveforms of the power converter shown in FIG. 7 in accordance with various embodiments of the present disclosure.

FIG. 9 illustrates a second group of waveforms of the power converter shown in FIG. 7 in accordance with various embodiments of the present disclosure. The waveforms shown in FIG. 9 are obtained when the input voltage of the power converter 700 is equal to the output voltage of the power converter 700. The waveforms as well as the operating principle of the detector 104 are similar to those shown in FIG. 8, and hence are not discussed herein to avoid repetition.

Figure 10:
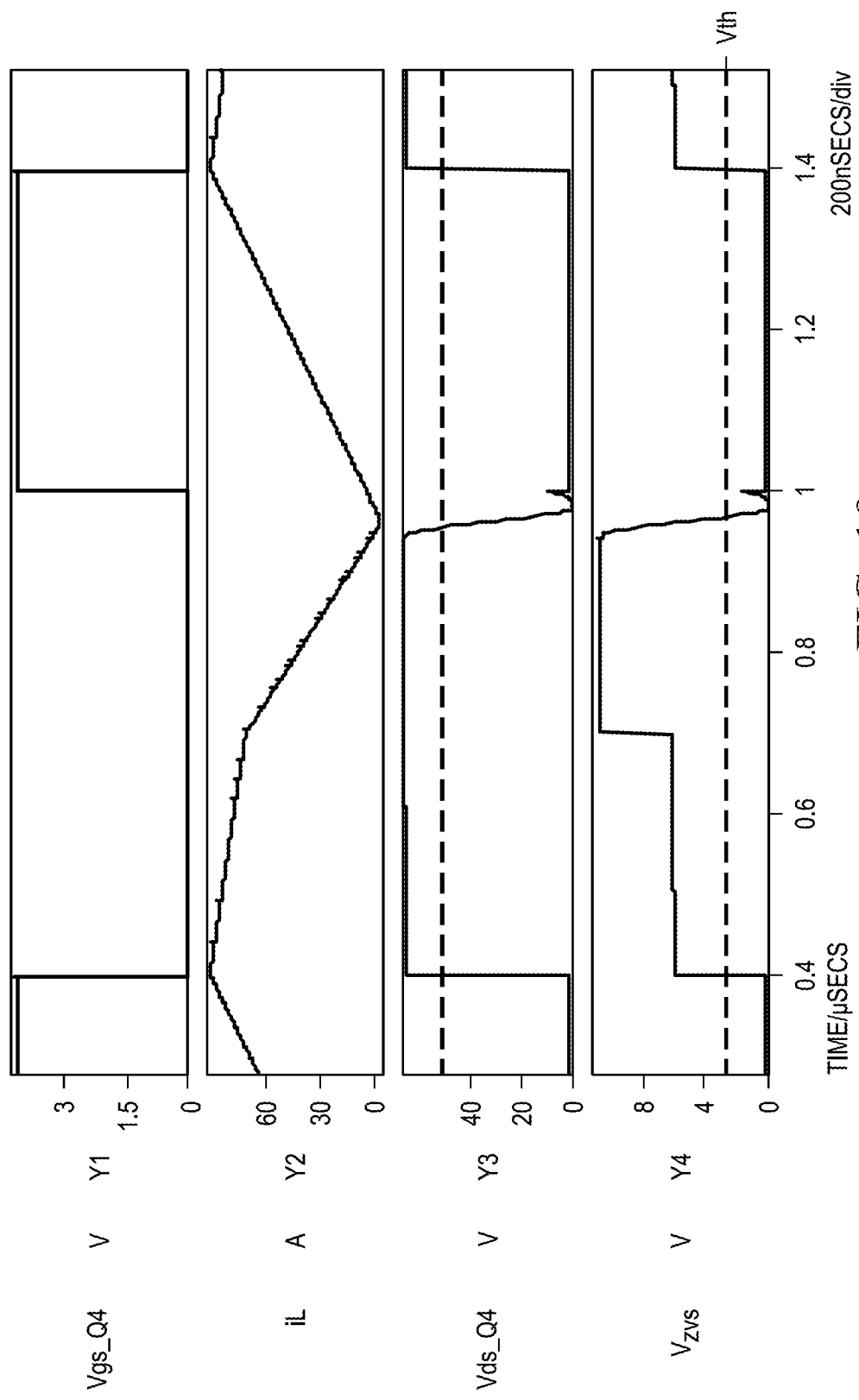
FIG. 10 illustrates a third group of waveforms of the power converter shown in FIG. 7 in accordance with various embodiments of the present disclosure.

FIG. 10 illustrates a third group of waveforms of the power converter shown in FIG. 7 in accordance with various embodiments of the present disclosure. The waveforms shown in FIG. 10 are obtained when the output voltage of the power converter 700 is greater than the input voltage of the power converter 700. The waveforms as well as the operating principle of the detector 104 are similar to those shown in FIG. 8, and hence are not discussed herein to avoid repetition.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
   a switch network coupled to a power source, wherein the switch network comprises a plurality of power switches;
   a magnetic device coupled to the switch network;
   a detector coupled to the magnetic device through a magnetic coupling, wherein a continuous current flowing through a primary side of the magnetic coupling is proportional to a current flowing through a power inductor of the converter, and wherein the detector comprises a dc blocking capacitor having a first terminal connected to a secondary side of the magnetic coupling, a diode and a resistor connected in series and further coupled to a second terminal of the dc blocking capacitor, and a voltage divider coupled to the second terminal of the dc blocking capacitor; and
   a control circuit configured to receive a zero voltage switching signal from the detector and adjust gate drive signals of the power switches based upon the zero voltage switching signal.

2. The converter of claim 1, wherein the magnetic coupling is implemented as a signal transformer, and wherein:
   a primary side of the signal transformer is the magnetic device; and
   a secondary side of the signal transformer is coupled to the detector.

3. The converter of claim 2, wherein:
   the dc blocking capacitor is connected to the secondary side of the signal transformer.

4. The converter of claim 3, wherein:
   the control circuit is configured to turn on a power switch of the switch network after the zero voltage switching signal drops below a predetermined threshold.

5. The converter of claim 4, wherein:
   the predetermined threshold is in a range from about 0.5 V to about 1.0 V.

6. The converter of claim 4, wherein:
   a voltage across the power switch is approximately equal to zero when the power switch is turned on.

7. The converter of claim 1, wherein the switch network comprises:
   a first power switch and a second power switch connected in series between two terminals of the power source, wherein a common node of the first power switch and the second power switch is connected to the magnetic device.

8. The converter of claim 1, wherein the switch network comprises:
a first power switch and a second power switch connected in series between two terminals of an output capacitor, wherein a common node of the first power switch and the second power switch is connected to the magnetic device.

9. The converter of claim 1, wherein the switch network comprises:
a first power switch and a second power switch connected in series between two terminals of the power source, and wherein a common node of the first power switch and the second power switch is connected to a first terminal of the magnetic device; and
a third power switch and a fourth power switch connected in series between two terminals of an output capacitor, and wherein a common node of the third power switch and the fourth power switch is connected to a second terminal of the magnetic device.

10. The converter of claim 1, wherein:
the magnetic device is an inductor.

11. A method comprising:
providing a power converter, wherein the power converter comprises:
an inductor coupled to a switch network;
a detector coupled to the inductor through a magnetic coupling, wherein a continuous current flowing through a primary side of the magnetic coupling is proportional to a current flowing through the inductor, and wherein the detector comprises a dc blocking capacitor having a first terminal connected to a secondary side of the magnetic coupling, a diode and a resistor connected in series and further coupled to a second terminal of the dc blocking capacitor, and a voltage divider coupled to the second terminal of the dc blocking capacitor; and
a control circuit coupled between the detector and the switch network;
detecting a signal indicating a soft switching process of a power switch of the switch network; and
turning on the power switch after a magnitude of the signal is less than a predetermined threshold.

12. The method of claim 11, further comprising:
detecting the signal indicating a soft switching process of the power switch, wherein the signal is measured from the inductor through the magnetic coupling, and wherein the magnetic coupling is implemented as a signal transformer, and wherein:
a primary side of the signal transformer is the inductor; and
a secondary side of the signal transformer is coupled to the detector.

13. The method of claim 12, wherein:
the dc blocking capacitor is connected to the secondary side of the signal transformer.

14. The method of claim 13, further comprising:
receiving the signal indicating the soft switching process of the power switch through the signal transformer; and
scaling the signal down to a level suitable for the control circuit through the voltage divider.

15. The method of claim 11, wherein:
the power converter is a non-isolated dc/dc converter.

16. A method comprising:
providing a dc/dc converter, wherein the dc/dc converter comprises:
a switch network coupled to a power source, wherein the switch network comprises a plurality of power switches;
a magnetic device coupled to the switch network;
a detector coupled to the magnetic device through a magnetic coupling, wherein a continuous current flowing through a primary side of the magnetic coupling is proportional to a current flowing through a power inductor of the dc/dc converter, and wherein the detector comprises a dc blocking capacitor having a first terminal connected to a secondary side of the magnetic coupling, a diode and a resistor connected in series and further coupled to a second terminal of the dc blocking capacitor, and a voltage divider coupled to the second terminal of the dc blocking capacitor; and
a control circuit coupled between the detector and the switch network;
detecting a signal indicating a zero voltage switching process of a power switch of the dc/dc converter; and
turning on the power switch by the control circuit after the signal indicating the zero voltage switching process drops below a predetermined threshold.

17. The method of claim 16, further comprising:
coupling the detector to the magnetic device through a signal transformer, wherein a primary side of the signal transformer is an inductor of a buck dc/dc converter.

18. The method of claim 16, further comprising:
coupling the detector to the magnetic device through a signal transformer, wherein a primary side of the signal transformer is an inductor of a boost dc/dc converter.

19. The method of claim 16, wherein:
coupling the detector to the magnetic device through a signal transformer, wherein a primary side of the signal transformer is an inductor of a buck-boost dc/dc converter.

20. The method of claim 19, wherein:
the buck-boost dc/dc converter is a four-switch buck-boost dc/dc converter.

* * * * *